(12) United States Patent
Okitsu et al.

(10) Patent No.: US 7,173,350 B2
(45) Date of Patent: Feb. 6, 2007

(54) LOAD DRIVE CONTROL APPARATUS HAVING MINIMIZED POWER CONSUMPTION WHEN FUNCTIONING IN WAITING STATUS

(75) Inventors: Yosuke Okitsu, Anjo (JP); Junji Sugiura, Toyota (JP)

(73) Assignee: Denso Corporation, Kariya (JP)

( * ) Notice: Subject to any disclaimer, the term of this patent is extended or adjusted under 35 U.S.C. 154(b) by 329 days.

(21) Appl. No.: 10/606,863

(22) Filed: Jun. 27, 2003

(65) Prior Publication Data
US 2004/0001301 A1 Jan. 1, 2004

(30) Foreign Application Priority Data
Jun. 27, 2002 (JP) ............................. 2002-187837
Feb. 14, 2003 (JP) ............................. 2003-036974

(51) Int. Cl.
*H01H 9/54* (2006.01)
(52) U.S. Cl. .................................................... 307/140
(58) Field of Classification Search ................. 307/140
See application file for complete search history.

(56) References Cited
U.S. PATENT DOCUMENTS
4,636,711 A * 1/1987 Freymuth ................... 323/282

6,232,758 B1   5/2001  Konda et al.
6,778,001 B2 * 8/2004  Mayama et al. ............ 327/427

FOREIGN PATENT DOCUMENTS

| JP | 9-160684 | 6/1997 |
|---|---|---|
| JP | 2000-115997 | 4/2000 |
| JP | 2001-231290 | 8/2001 |

* cited by examiner

*Primary Examiner*—Brian Sircus
*Assistant Examiner*—Dru Parries
(74) *Attorney, Agent, or Firm*—Posz Law Group, PLC (57) ABSTRACT

In a load drive control system containing a control apparatus and a drive apparatus which drives a load in accordance with a drive control signal supplied from the control apparatus, a single signal produced from the control apparatus serves both as the drive control signal and as a power supply enabling control signal for the drive apparatus, without the need to provide an internal DC power supply in the drive apparatus. A switching element in the drive apparatus is controlled to apply a supply voltage from a drive power source to circuits in the drive apparatus only while the drive control signal is being supplied from the control apparatus.

4 Claims, 5 Drawing Sheets

LOAD DRIVE CONTROL APPARATUS HAVING MINIMIZED POWER CONSUMPTION WHEN FUNCTIONING IN WAITING STATUS

BACKGROUND OF THE INVENTION

1. Field of Application

The present invention relates to a load drive control system having a control apparatus such as a vehicle ECU (Electronic Control Unit), and a drive apparatus which drives a load in response to a control signal that is produced from the control apparatus.

2. Description of Related Art

Types of ECU that are used in a motor vehicle include for example a body ECU, a door ECU, air conditioner ECU, etc., which control respectively different loads. For example in the case of the air conditioner ECU, this controls the cooling cycle by driving the compressor of an air conditioner unit, and also controls the driving of a blower motor which produces a flow of cooling air.

Figure 5:
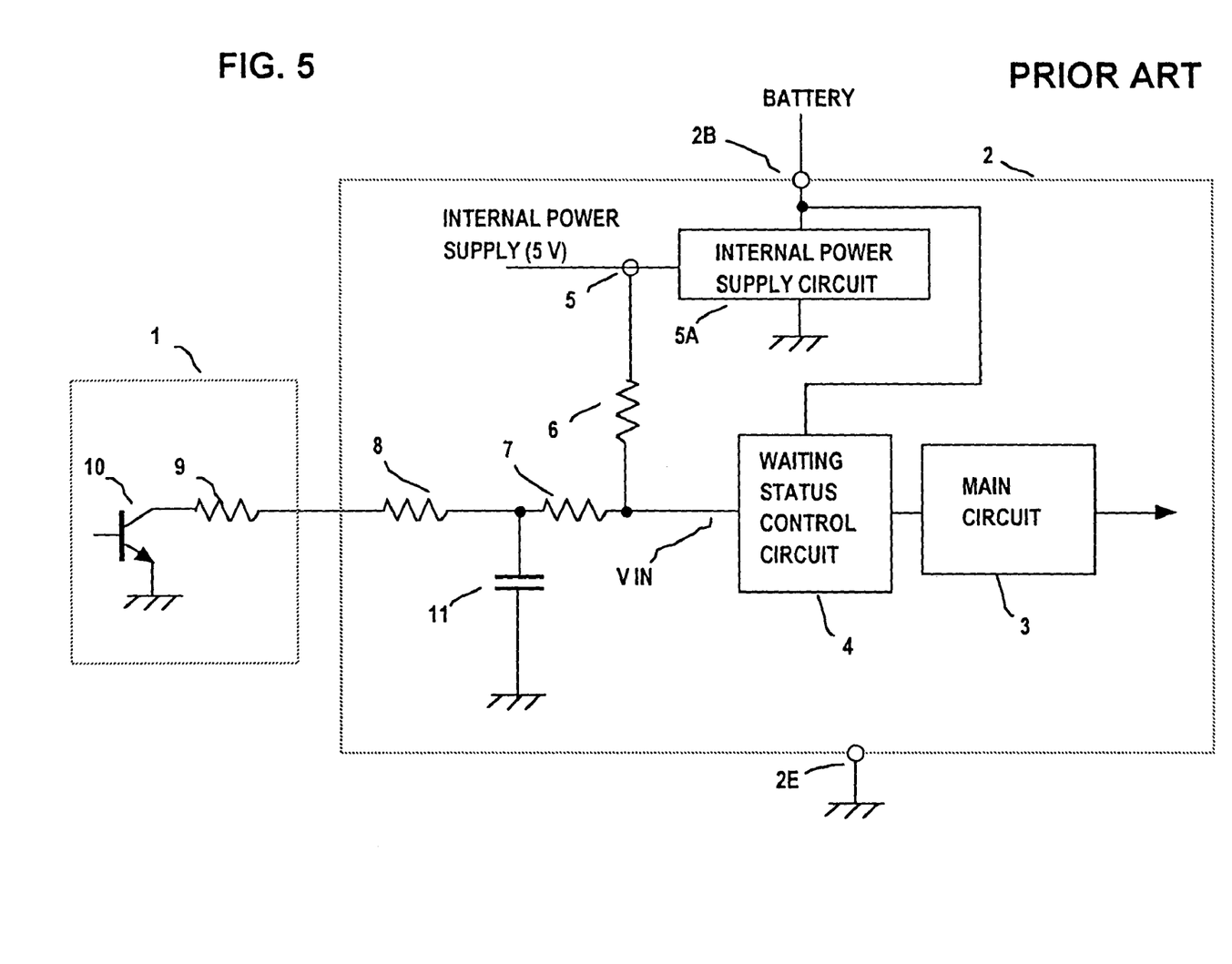
FIG. 5 is a circuit diagram of a prior art example of a load drive control system.

FIG. 5 is a simplified diagram of a prototype of a blower motor drive control system based on an air conditioner ECU 1. A blower motor (not shown in the drawing) is driven by a main circuit 3 of the drive apparatus 2. The output voltage of the vehicle battery is supplied as a DC power source to a waiting status control circuit 4. When the air conditioner is not being used, so that driving of the blower motor is not required, the waiting status control circuit 4 sets the operation of the main circuit 3 in a waiting status. The waiting status control circuit 4 establishes this waiting status in response to a command value VIN, determined by a control signal from the ECU 1 being at a specific potential. When the transistor 10 in the ECU 1 is set in the ON state, this constitutes the outputting of a waiting status release command, whereby the waiting status control circuit 4 sets the main circuit 3 in the operating condition. In that way, the main circuit 3 is selectively set in a waiting status or in an operating status, under the control of the command signal that is supplied from the ECU 1.

However with such a system, DC supply power must be continuously supplied from the vehicle battery to the waiting status control circuit 4 and to an internal DC power supply circuit 5A of the drive apparatus 2, even while the waiting status is established.

Thus, such a prototype system has the disadvantage that battery power must be continuously supplied to an internal DC power supply circuit of the drive apparatus 2 while the main circuit 3 is in the waiting status, i.e., while the drive apparatus 2 is not in use. At present, there is a requirement to reduce such forms of power consumption, as far as possible.

SUMMARY OF THE INVENTION

It is an objective of the present invention to overcome the above problem of the prior art, by providing a load drive control system whereby the amount of power consumed from a drive power source while the apparatus is functioning in a waiting status can be reduced. According to a first aspect, the invention provides a load drive control system in which a control apparatus incorporates an internal DC power supply which is utilized in supplying a power supply enabling control signal to a drive apparatus, by controlling a switching element in the control apparatus to selectively connect and disconnect a signal input point within the drive apparatus to and from the DC voltage of the internal power supply of the control apparatus. The drive apparatus includes a drive signal output section for controlling driving of a load such as a motor with power supplied from a drive power source, and a power supply enabling control section which is controlled by the power supply enabling control signal such as to connect the drive power source to the drive signal output section when the power supply enabling control signal is being supplied and to disconnect the drive power source from the drive signal output section when supplying of the power supply enabling control signal is halted.

In that way, it becomes unnecessary to provide an internal power supply within the drive apparatus as is necessary in the prior art, for the purpose of applying an input signal of appropriate amplitude to signal processing circuits in the drive apparatus, and an internal power supply of the control apparatus (which may be for example a vehicle ECU) can be utilized instead, e.g., a standard 5 V internal power source of an ECU. In addition, no power is consumed by the drive apparatus when in the waiting status, so that reduced overall power consumption can be achieved for the system.

According to a second aspect, the invention provides such a load drive control system, in which the power supply enabling control signal serves also as a drive control signal that is supplied to the drive apparatus for controlling driving of the load. In that case, the drive signal output section receives the drive control signal from the aforementioned signal input point, and controls driving of the load accordingly. At the same time, enabling or inhibiting the supply of power from the drive power source to the drive signal output section is controlled as described above, in accordance with whether or not the drive control signal/power supply enabling control signal is being applied from the control apparatus.

In that way, it is unnecessary to provide an additional input signal to the drive apparatus, transferred via a separate connecting lead from the control apparatus, for the purpose of supplying the drive control signal, so that the interface between the control apparatus and drive apparatus is simple.

Typically, such a drive control signal consists of a train of pulses, such as a PWM (Pulse Width Modulation) signal. In such a case, according to another aspect of the invention, the power supply enabling control section of the drive apparatus includes an integrator circuit which is connected to the aforementioned signal input point and integrates the PWM pulses to derive an integrated voltage that is applied as a bias voltage to a control electrode of a first switching element. The first switching element is thereby held continuously in the conducting condition so long as the PWM drive control signal continues to be supplied. The first switching element is coupled to control a second switching element, to maintain the second switching element in the conducting condition while the first switching element is in the conducting condition. The second switching element is connected between the drive power source and the drive signal output section, for thereby supplying power from the drive power source to the drive signal output section while the PWM drive control signal is being supplied, and for isolating the drive signal output section from the drive power source when supplying of the PWM drive control signal from the control apparatus is halted.

Such a configuration has the advantage that, due to factors such as the greater pulse width of the PWM pulses as compared with electrical noise spikes which may be applied from the exterior to the signal input point of the drive apparatus, such electrical noise will be effectively absorbed by the integrator circuit while the drive apparatus is in the waiting status, and cannot cause an integrated voltage to be developed that will be of sufficient magnitude to cause erroneous operation of the drive apparatus.

According to another aspect, the system can be configured to be compatible with a control apparatus in which all output signals are generated as "pull-down" outputs, i.e., whereby an output signal is generated at an output terminal by controlling a switching element to selectively connect and disconnect that output terminal from a common ground potential of the system. A switching element which performs such a function is sometimes referred to as a "low-side" switching element. In that case, the power supply enabling control section of the drive apparatus includes a signal level lowering circuit connected to the aforementioned signal input point, and a resistor connected between the signal input point and the drive power source, and coupled to control a first switching element such that the supply voltage of the drive power source is applied to the drive signal output section only while current flows through that resistor. In that way it can be ensured that the power supply enabling control signal has a maximum level that is determined by the signal level lowering circuit.

The signal level lowering circuit may be implemented as a zener diode that is connected to the signal input point, and a second switching element which is controlled to selectively enable/disenable a current path through the aforementioned resistor and the zener diode to ground potential, in accordance with whether or not the power supply enabling control signal is being supplied.

It can be understood that with such an arrangement too, the power supply enabling control signal can be utilized also as a drive control signal, i.e., which is inputted from the aforementioned signal input point to the drive signal output section, for controlling driving of a load.

In that way, it can be ensured that power is supplied to the drive signal output section (and to the power supply enabling control section) from the drive power source only while the power supply enabling control signal is being supplied from the control apparatus, while moreover the input signal amplitude that is applied to the drive signal output section can be limited to an appropriate value.

DESCRIPTION OF PREFERRED EMBODIMENTS

Figure 1:
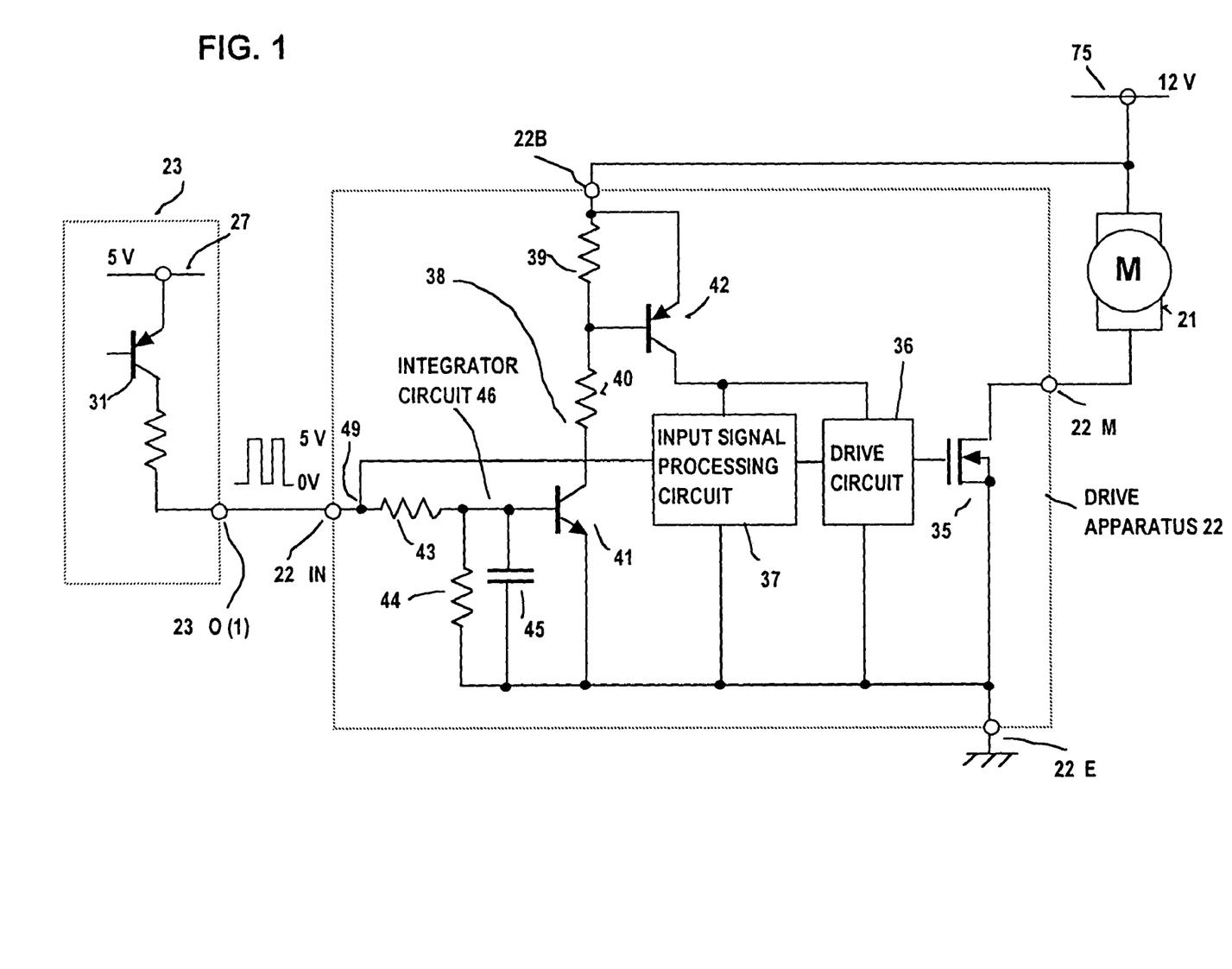
FIG. 1 is a circuit diagram of a first embodiment of a load drive control system which is applied to a motor vehicle, showing details of the internal configuration of a drive apparatus of the embodiment.
Figure 2:
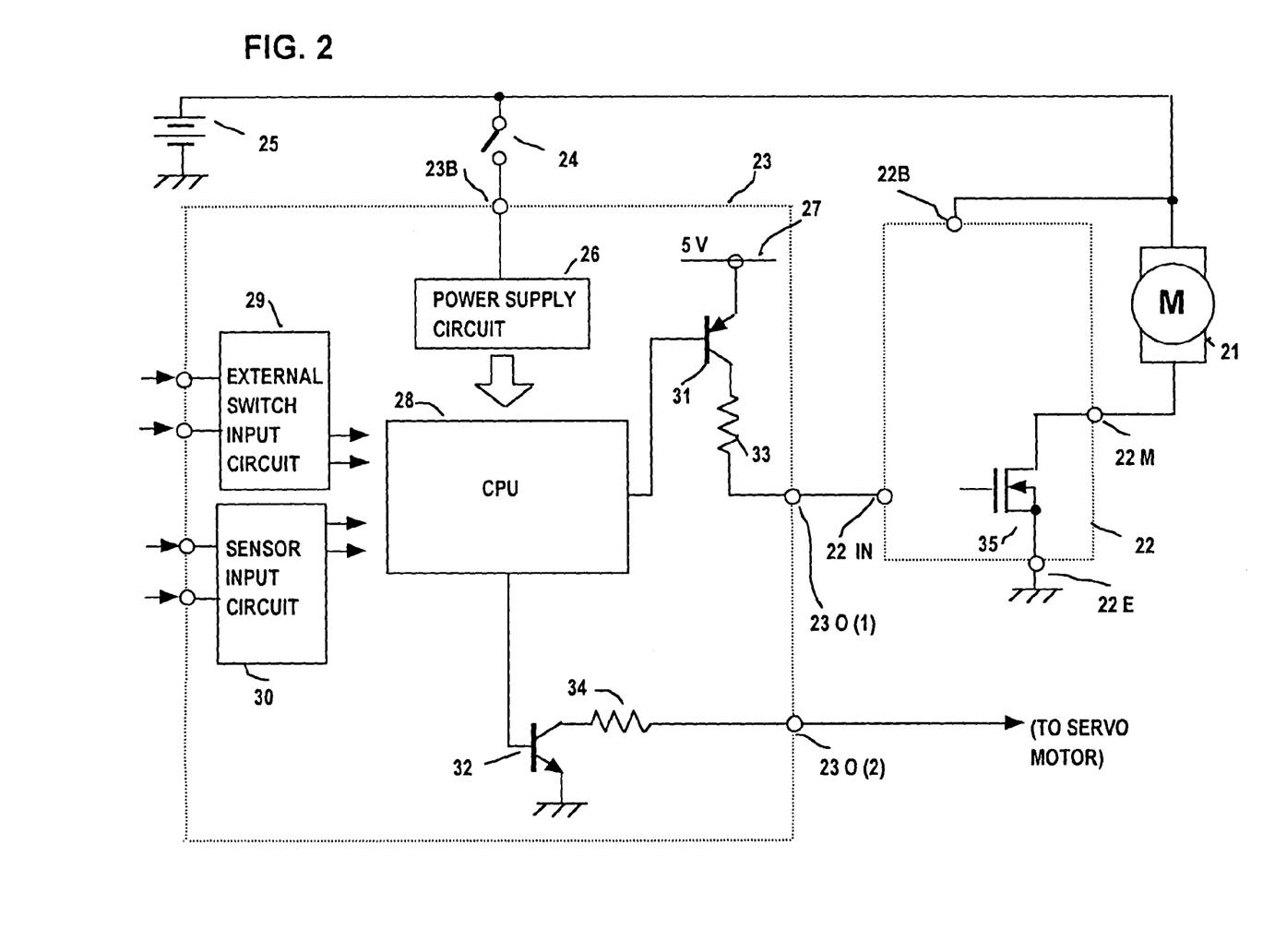
FIG. 2 is a circuit diagram of the first embodiment, showing details of the internal configuration of an ECU constituting a control apparatus of the embodiment.

An embodiment of a load drive control system according to the present invention will be described in the following, referring to FIGS. 1 and 2. FIG. 1 shows the overall circuit configuration of this embodiment, which constitutes a load drive control system for use in a motor vehicle, for driving a motor such as a blower motor of an air conditioner unit. FIG. 2 shows details of the internal configuration of a drive apparatus 22 of this embodiment, in relation to an ECU 23 which constitutes a control apparatus that controls the drive apparatus 22, and a blower motor 21 which constitutes the load that is driven by the drive apparatus 22.

As shown in FIG. 2, the ECU 23 is based on a CPU 28. The 12 V DC supply voltage from a battery 25 is applied to the blower motor 21, and via an ignition switch 24 to a power supply terminal 23B of the ECU 23 and a power supply terminal 22B of the drive apparatus 22. Switch signals from various operating switches of the vehicle are supplied to an external switch input circuit 29 of the ECU 23, and sensor signals from various sensors of the vehicle are similarly supplied to an external switch input circuit 30. The signals are thereby transferred to input ports of the CPU 28.

An output port of the CPU 28 is coupled to the base electrode of a PNP transistor 31, while another output port is coupled to the base electrode of an NPN transistor 32. The emitter of the transistor 31 is connected to a supply lead 27 which conveys a 5V DC supply voltage that is produced from an internal power supply of the ECU 23 such as the internal power supply circuit 26, while the collector of the transistor 31 is coupled via a resistor 33 to a signal output terminal 23O (1). The transistor 31 thus functions as a switching element which is controlled to selectively connect/disconnect the 5 V supply voltage to/from the output terminal 23O (1). Such a switching element is sometimes referred to as a "high-side" switching element, as opposed to a switching element such as the transistor 32 which is controlled to selectively connect/disconnect an output terminal from ground potential, with the latter switching element being sometimes referred to as a "low-side" switching element.

A PWM signal is supplied from the CPU 28 to the base of the transistor 31, thereby repetitively switching that transistor between the on and off states, so that a corresponding PWM signal varying between +5 V and ground potential (0 V) is applied to the resistor 33, with a substantially identical PWM signal appearing at the signal output terminal 23O (1).

The output signal that is thereby supplied to the drive apparatus 22 from the signal output terminal 23O (1) constitutes both a drive control signal and a power supply enabling control signal. When the CPU 28 ceases to produce the PWM signal, the base of the transistor 31 is held at the same (+5 V) potential as the emitter of that transistor, so that no current flows in the resistor 33.

The CPU 28 has a second output port which is connected to the base of a NPN transistor 32, whose emitter is connected to ground potential and whose collector is coupled via a resistor 34 to a signal output terminal 23O (2), and from there to a servo motor which controls the vent aperture of the air conditioner unit.

As shown in FIG. 1, the drive apparatus 22 has the aforementioned power supply terminal 22B which receives the 12 V supply from the vehicle battery 25, via a connecting lead 75, and a power supply terminal 22E which is connected to ground potential. The drive apparatus 22 further includes an output terminal 22M which is connected to the blower motor 21. A FET 35 has drain and source electrodes connected to the output terminal 22M and to ground potential respectively, for thereby controlling the supply of drive current through the blower motor 21. The drive apparatus 22 further includes a drive circuit 36 and an input signal processing circuit 37 which in combination constitute a drive signal output section, with the input terminal of the input signal processing circuit 37 connected to a signal input point 49, for thereby receiving the PWM control signal supplied from the output terminal 23O (1) of the ECU 23 via a signal input terminal 22IN of the drive apparatus 22, performing processing of that PWM control signal and supplying the resultant control signal to the drive circuit 36, which drives the gate of the FET 35 and thereby controls the supply of drive voltage to the blower motor 21.

The drive apparatus 22 further includes an integrator circuit 46, constituted by a capacitor 45 and a pair of resistors 43, 44 which are connected in series between the signal input point 49 and ground potential, with the capacitor 45 connected between the junction of the resistors 43, 44 and ground potential. The base of a NPN transistor 41, constituting a first switching element, is connected to the junction of the resistors 43, 44, with the emitter of the transistor 41 being connected to ground potential. As a result, while the PWM control signal is being supplied to the drive apparatus 22 from the ECU 23, an integrated voltage constituting a forward bias voltage is developed across the capacitor 45 and applied between the base and emitter of the transistor 41, of sufficient magnitude to maintain that transistor in the saturation state The drive apparatus 22 also includes a pair of resistors 39, 40 which are connected in series between the power supply terminal 22B and the collector of the transistor 41, and a PNP transistor 42, constituting a second switching element, whose base is connected to the junction of the resistors 39, 40 and whose emitter is connected to the power supply input terminal 22B, and whose collector is coupled to respective power supply inputs of the drive circuit 36 and input signal processing circuit 37.

The combination of transistor 41, resistors 39, 40, 43, 44, capacitor 45 and transistor 42, respectively connected as described above, constitute a power supply enabling control section 38 of the drive apparatus 22.

The operation of this circuit is as follows. While the PWM control signal is being supplied to the drive apparatus 22 from the ECU 23, so that an integrated voltage is being applied as a forward bias voltage to the base of the transistor 41, that transistor is held in the on (i.e., saturated) condition, so that the 12 V battery voltage is applied across the pair of resistors 38, 39. The base of the transistor 42 is thereby forward-biased, with the value of the resistor 40 being predetermined such that the transistor 42 will be driven into saturation under this condition. The 12 V battery voltage is thereby supplied via the transistor 42 to operate each of the drive circuit 36 and input signal processing circuit 37. A drive signal is thereby applied from the drive circuit 36 to the gate of the FET 35, so that the FET 35 controls driving of the blower motor 21 in accordance with the PWM control signal.

When the PWM control signal ceases to be supplied from the ECU 23 (i.e., the drive apparatus 22 is set in a waiting status) so that current ceases to flow into the base of the transistor 41, that transistor is set in the cut-off state, thereby terminating the flow of current from the base of the transistor 42, which also is thereby set in the cut-off state. The supply of current from the battery 25 to operate the drive circuit 36 and input signal processing circuit 37 is thereby halted.

In that way, with only a single connecting lead between the ECU 23 and the drive apparatus 22, the blower motor 21 is driven in accordance with the PWM control signal produced from the ECU 23 so long as that control signal is being outputted from the ECU 23, and when that control signal ceases to be produced, the supply of power from the battery 25 to the drive signal output section (as defined hereinabove) of the drive apparatus 22 is automatically terminated. In addition, no power is consumed by the power supply enabling control section 38 in that condition. In that way, a reduction in battery power consumption can be achieved by comparison with the prior art, without the need to provide any additional control signals, so that the interface between the ECU 23 and drive apparatus 22 can be extremely simple.

As a further advantage of the above embodiment, as a result of incorporation of the integrator circuit 46, if any electrical noise should be applied to the input terminal 22IN while the drive apparatus 22 is held in the waiting status, since such noise consists of brief-duration spikes, these will be effectively eliminated by the integrator circuit, so that no substantial bias voltage will be developed across the capacitor 45 of the integrator circuit. Hence, the drive apparatus 22 will not be erroneously set in the operating status as a result of such noise.

However it should be noted that the invention is not limited to the configuration described above, and that for example it would be possible to provide a configuration whereby a drive control signal and a power supply enabling control signal are respectively separate signals.

With the first embodiment described above, it is necessary to configure the ECU 23 with two different arrangements for driving the signal output terminals, i.e., using both "high-side" and "low-side" switching elements such as the transistors 31 and 32 respectively, shown in FIG. 2. This may be undesirable from the aspect of lowering manufacturing costs of such a system, i.e., it may be preferable to utilize only "low-side" switching elements, which do not apply a voltage from an internal power supply of the control apparatus to output terminals, but simply connect/disconnect output terminals of the control apparatus to/from the system ground potential. For that reason, a second embodiment will be described whereby, in the same way as for the prior art example of FIG. 5, the control apparatus supplies to the drive apparatus a control signal from an output terminal which alternates between a condition of being connected to and disconnected from the system ground potential.

Figure 3:
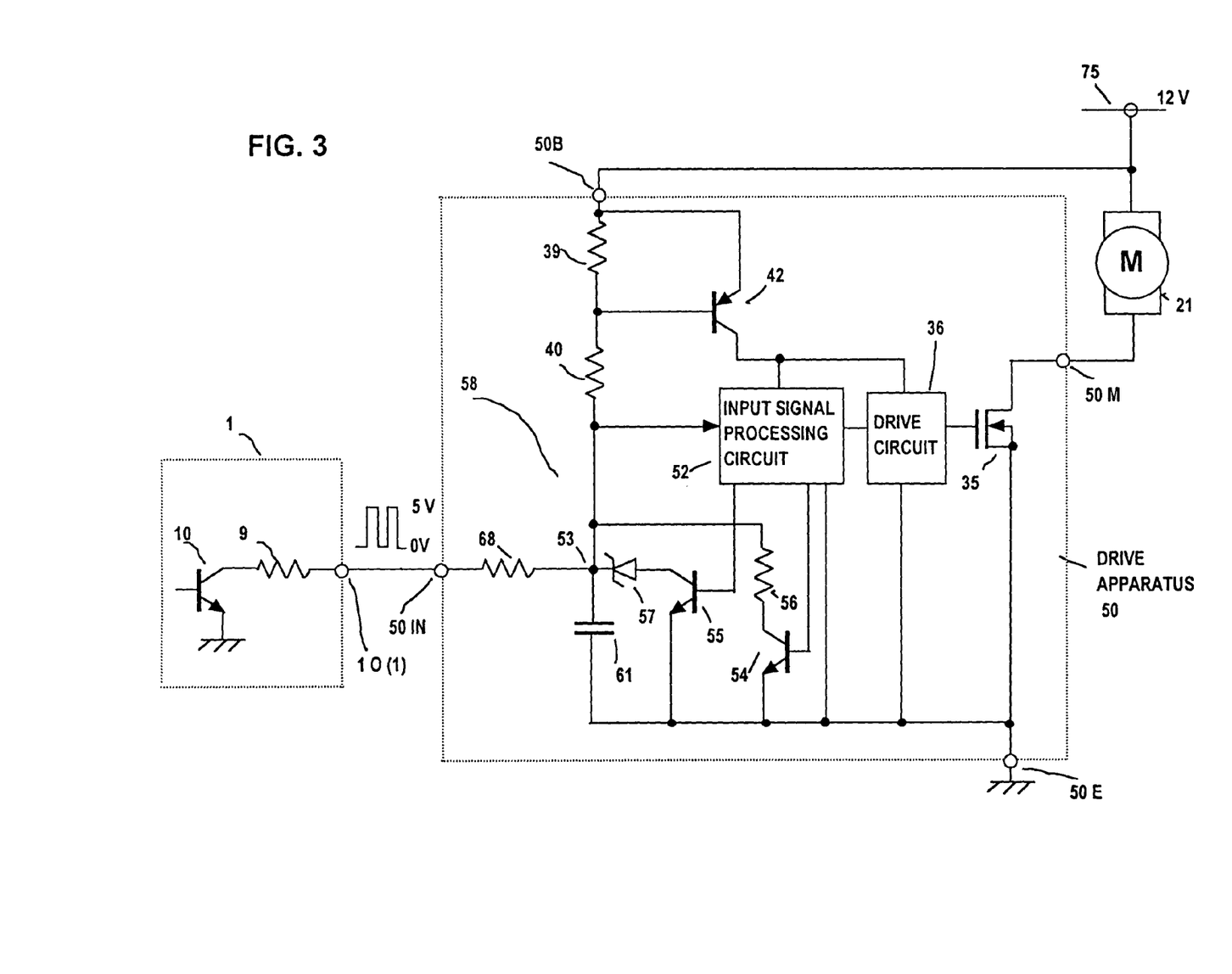
FIG. 3 is a circuit diagram of a second embodiment of a load drive control system which is applied to a motor vehicle, showing details of the internal configuration of a drive apparatus of the embodiment.

FIG. 3 is a circuit diagram showing details of the internal configuration of the drive apparatus 50 of the second embodiment, and the condition of connection to the ECU 1. Components which correspond in function to components in the drive apparatus 22 of the first embodiment are indicated by corresponding reference numerals, and detailed description of these will be omitted. The drive apparatus 50 is based on an input signal processing circuit 52 and drive circuit 36, which in combination constitute a drive signal output section, with a drive signal produced from the drive circuit 36 being applied to the gate of the FET 35, to thereby control driving of a load constituted by the blower motor 21.

The ECU 1 can be configured as described for the ECU 23 of the first embodiment, other in that the function of the PNP transistor 31 is performed by the NPN transistor 10 shown in FIG. 3, i.e., a drive signal applied to the base of the transistor 10 from the CPU of the ECU 1 sets the transistor 10 in the on (saturation) state when the PWM control signal is to attain the 0 V level, and sets transistor 10 in the off (non-conducting) state when the PWM control signal is to attain the 5 V level.

In the drive apparatus 50, the PWM control signal is inputted to the input signal processing circuit 52, which applies processing to that control signal and supplies a resultant control signal to the drive circuit 36, which drives the gate of the FET 35 as described for the first embodiment, to thereby control driving of the blower motor 21.

The PWM control signal is applied to an input terminal 50IN of the drive apparatus 50, and transferred through a resistor 68 and a zener diode 57 to the collector of a NPN transistor 55. A capacitor 61 is connected between the junction of the resistor 68 and the cathode of the zener diode 57 (with that junction being referred to in the following as the signal input point 53) and ground potential.

The values of the resistor 68 and capacitor 61 are selected such that these serve a similar function to that of the resistor 8 and capacitor 11 of the prior art example of FIG. 5, i.e., suppression of input electrical noise, rather than functioning as an integrator circuit with respect to the PWM control signal, as is the case with the resistor 43 and capacitor 45 in the drive apparatus 22 of the first embodiment.

The drive apparatus 50 further includes NPN transistors 54 and 55, each having the emitter thereof connected to ground potential. The collector of the transistor 54 is connected via a resistor 56 to the signal input point 53, while the collector of the transistor 55 is connected through the zener diode 57 to the signal input point 53. First and second internal control signals, which are produced by the input signal processing circuit 52 as described hereinafter when the drive apparatus 50 is in the operating status, are respectively applied to the bases of transistors 54 and 55.

The resistors 39, 40 and the transistor 42 are mutually connected, with the junction of the emitter of the transistor 42 and the resistor 39 being coupled to receive the 12 V battery voltage as described for the first embodiment, so that the 12 V battery voltage is supplied from the collector of the transistor 42 to each of the input signal processing circuit 52 and the drive circuit 36 when base current from transistor 42 flows in the resistor 40. However with the second embodiment, the lower end of the resistor 40 is connected to the signal input point 53, from which the PWM control signal is inputted to the input signal processing circuit 52.

The operation of this embodiment is as follows. When the drive apparatus 50 is in the waiting status, the CPU of the ECU 1 holds the transistor 10 in the off condition, while in addition the internal control signals from the input signal processing circuit 52 are at the ground potential so that both of the transistors 54, 55 are in the off condition. In that state, the potential of the signal input point 53 is fixed at that of the drive power source, i.e., approximately 12 V, so that the transistor 42 is held in the off condition. Thus, no power is supplied from the drive power source to the drive apparatus 50 in this condition.

Figure 4:
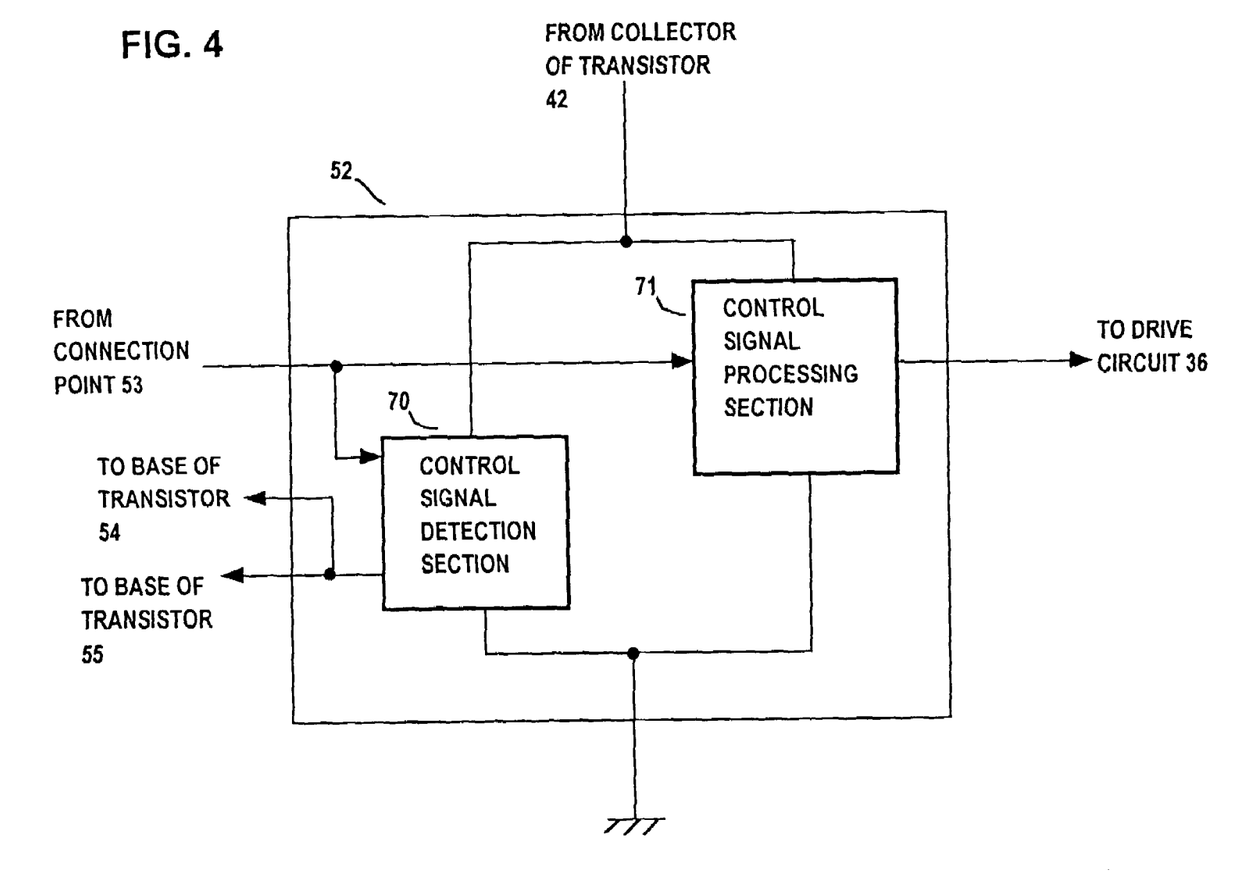
FIG. 4 is a general circuit block diagram of an input signal processing circuit in the drive apparatus of the second embodiment.

When the waiting status is to be terminated, and the PWM control signal begins to be supplied from the ECU 1, i.e., the transistor 10 is first driven to the ON state, current thereby flows through the base of the transistor 42 and via the resistors 40 and 68 into the transistor 10. The transistor 42 is thereby set in the ON state, so that the 12 V battery voltage begins to be supplied to operate each of the input signal processing circuit 52 and drive circuit 36. The basic internal configuration of the input signal processing circuit 52 is illustrated in FIG. 4, formed of a control signal detection section 70 and a control signal processing section 71. When the 12 V supply voltage begins to be applied to the input signal processing circuit 52 from the collector of the transistor 42, thereby setting the control signal detection section 70 in operation, and the control signal detection section 70 then detects that the PWM control signal is being supplied to the drive apparatus 50, internal control signals thereby produced from the control signal detection section 70 drive the transistors 54, 55 respectively into the ON condition, and maintain that ON condition thereafter so long as the PWM control signal continues to be supplied.

In this condition, each time that transistor 10 is set in the OFF state, current flows from the base of transistor 42 through the resistor 40 into the parallel combination of the zener diode 57 and resistor 56. Thus, the voltage appearing at the signal input point 53 is clamped at 5 V by the zener diode 55. Each time that the transistor 10 is set in the ON state, the base current of transistor 42 flows through the resistor 40 to ground potential via the transistor 10 in the control apparatus, so that the potential at the signal input point 53 becomes close to 0 V.

As a result, the transistor 42 is held in the ON state, so that the 12 V supply voltage is continuously supplied to the input signal processing circuit 52 and drive circuit 36 via the transistor 42.

Hence, the PWM control signal is applied at the input to the input signal processing circuit 52 as a signal which varies between the 0 V and 5 V potentials.

When the drive apparatus 50 is to be set in the waiting status, so that the CPU of the ECU 1 sets the transistor 10 in the OFF state, the potential at the signal input point 53 will first become fixed at the 5 V level. The control signal detection section 70 of the input signal processing circuit 52 thereby detects that the supply of the PWM control signal has terminated, and so sets each of the internal control signals to ground potential. Each of the transistors 54, 55 is thereby set in the OFF state. As a result, current can no longer flow through the zener diode 57, so that the potential at the signal input point 53 rises to the 12 V of the battery 25, and remains at that level. The transistor 42 is thereby set in the OFF state, so that the battery voltage ceases to be supplied to the input signal processing circuit 52 and drive circuit 36 via the transistor 42. The drive apparatus 50 has thus been set in the waiting status, with no current being supplied from the battery 25.

It can thus be understood that with this embodiment, the ECU 1 can be configured with a standard type of "pull-down" interface circuit arrangement, using a "low-side" switching element at each of its signal output terminals, in the same way as for the prior art example of FIG. 5, and that control of the blower motor 21 by the PWM control signal can be applied as described for that prior art example, but that the requirement for an internal power supply circuit in the drive circuit 50 is eliminated. Hence, reduced consumption of battery power is achieved, since no current is drawn from the battery 25 to operate an internal power supply circuit (such as circuit 5A in FIG. 5) when the drive apparatus 50 is in the waiting status.

In addition, this advantage is achieved while maintaining a simple interface configuration between the ECU 1 and drive apparatus 50, with only a single connecting lead being required.

It will be apparent that various arrangements could readily be envisaged for implementing the control signal detection section 70 in the input signal processing circuit 52 of the second embodiment (i.e., for immediately starting to generate an internal control signal when it is detected that a PWM control signal has started to be supplied to the input signal processing circuit 52) so that detailed description is omitted.

Furthermore, as an alternative configuration of the second embodiment, it would be possible to connect the base of the transistor 55 to the collector of the transistor 42, with similar results being obtained to those described above.

It should be noted that the invention is not limited in application to motor vehicles, but is generally applicable to various other systems in which driving of a load may be temporarily set in a waiting status.

Moreover the invention is applicable to driving various forms of load other than a motor.

Furthermore the invention is not limited in application to a PWM type of control signal, but could be applied to various other types of control signal.

What is claimed is:

1. A load drive control system having a control apparatus, and a drive apparatus that performs driving of a load based on a control signal supplied from said control apparatus, wherein:

said control apparatus comprises:
a low-side switching element coupled to a signal input point within said drive apparatus, and
means for driving said low-side switching element in accordance with a pulse width modulation (PWM) signal to output a power supply enabling control signal by repetitively connecting and disconnecting said signal input point to and from a common ground potential of said control apparatus and drive apparatus, and said drive apparatus comprises:
a drive signal output section comprising control signal processing and output means coupled to receive said power supply enabling control signal, for outputting a drive signal for driving said load, in accordance with a duty ratio of said PWM signal, and control signal detection means coupled to said signal input point, for selectively generating an internal control signal in accordance with whether said power supply enabling control signal is being supplied,
a drive signal output section comprising control signal processing and output means coupled to receive said power supply enabling control signal, for outputting a drive signal for driving said load, in accordance with a duty ratio of said PWM signal, and control signal detection means coupled to said signal input point, for selectively generating an internal control signal in accordance with whether said power supply enabling control signal is being supplied,
power supply enabling control means controlled by said internal control signal for selectively enabling and interrupting a supply of DC electrical power at a first predetermined voltage level from a drive power source to said drive signal output section, and
signal level lowering means controlled by said internal control signal for setting a maximum level of said power supply enabling control signal at a second predetermined voltage level that is lower than said first predetermined voltage level, while said power supply enabling control signal is being supplied,
said power supply enabling control means of said drive apparatus comprises:
a first switching element connected to said drive power source and having a control input terminal thereof coupled to said signal input point, adapted to be thereby set from a non-conducting condition to a conducting condition when said power supply enabling control signal begins to be supplied from said control apparatus and thereby beginning to supply electrical power to said drive signal output section, and
a second switching element, adapted to be set in a conducting condition when said first switching element enters the conducting condition and to be thereafter held in said conducting condition until supplying of said power supply enabling control signal is terminated, said second switching element coupled to control said first switching element such as to maintain
power supply enabling control means controlled by said internal control signal for selectively enabling and interrupting a supply of DC electrical power at a first predetermined voltage level from a drive power source to said drive signal output section, and
signal level lowering means controlled by said internal control signal for setting a maximum level of said power supply enabling control signal at a second predetermined voltage level that is lower than said first predetermined voltage level, while said power supply enabling control signal is being supplied.

2. A load drive control system having a control apparatus, and a drive apparatus that performs driving of a load based on a control signal supplied from said control apparatus, wherein:

said control apparatus comprises:
a low-side switching element coupled to a signal input point within said drive apparatus, and
means for driving said low-side switching element in accordance with a pulse width modulation (PWM) signal to output a power supply enabling control signal by repetitively connecting and disconnecting said signal input point to and from a common ground potential of said control apparatus and drive apparatus,
said drive apparatus comprises: said first switching element continuously in the conducting condition while said power supply enabling control signal is being supplied, and
said signal level lowering means comprises:
a zener diode having a cathode thereof connected to said signal input point, and
a third switching element connected to an anode of said zener diode, controlled to be set in the conducting condition together with said first switching element, for thereby establishing a conducting path through said zener diode to said ground potential.

3. A load drive control system according to claim 2, wherein said second switching element is controlled by said internal control signal for being held continuously in the conducting condition while said power supply enabling control signal is being supplied.

4. A load drive control system according to claim 2, wherein a control input of said third switching element is coupled to said first switching element for thereby being connected to said second voltage level while said first switching element is in the conducting condition, said third switching element being thereby held continuously in the conducting condition while said power supply enabling control signal is being supplied.

* * * * *